March 30, 1971　　　F. CURN ET AL　　　3,573,013
METHOD OF FORMING A ZINC ALLOY BONDED DIAMOND ABRASIVE TOOL
Filed Oct. 5, 1967　　　　　　　　　　　　　4 Sheets-Sheet 1

INVENTORS
František Čurn, Antonín Dymeš
BY
Richard Low agt

United States Patent Office 3,573,013
Patented Mar. 30, 1971

3,573,013
METHOD OF FORMING A ZINC ALLOY BONDED DIAMOND ABRASIVE TOOL
František Čurn and Antonín Dymeš, Prague Czechoslovakia, assignors to Naradi, narodni podnik, Prague Czechoslovakia
Filed Oct. 5, 1967, Ser. No. 673,077
Claims priority, application Czechoslovakia, Dec. 10, 1966, 7,877/66
Int. Cl. C04d 31/16
U.S. Cl. 51—309         6 Claims

ABSTRACT OF THE DISCLOSURE

A grinding wheel in which diamond particles are uniformly distributed in an antimony-bearing zinc alloy and bonded by the alloy to each other and to a carrier disc is prepared by confining a packed particulate mixture including diamonds and antimony particles in a cavity bounded by a mold and the carrier inserted in the mold, introducing molten zinc alloy first by gravity and then under fluctuating fluid pressure, and solidifying the molten metal.

BACKGROUND OF THE INVENTION

This invention relates to grinding and polishing tools, and particularly to bonded grinding wheels. In its more specific aspects, the invention is concerned with wheels using diamonds and abrasive particles of similar high hardness.

When very hard abrasive particles are bonded by soft materials, such as synthetic resins, the grinding pressure is limited to relatively low values by the low strength of the bond. It is also impractical to employ inexpensive diamond chips and needle-like abrasive particles which tend to be torn from the soft bond before they are dulled.

Embedding of diamonds in conventionally employed relatively hard metals, such as bronze or nickel, results in a wheel in which dull diamonds are not readily dislodged, and fresh diamonds are not readily exposed by wear of the bond unless very high grinding pressures are employed.

One of us disclosed a diamond tool having a single layer of diamonds bonded by an antimony-bearing zinc alloy in U.S. Pat. No. 3,288,580, but the method of the earlier invention is not capable of being used in the manufacture of grinding tools in which the abrasive particles such as diamonds are distributed uniformly and in three dimensions in the alloy bond.

SUMMARY OF THE INVENTION

We now have found that such an abrasive tool can be prepared by inserting a carrier in a mold in such a manner that the carrier bounds a cavity in the mold, packing the cavity with particulate material which consists at least in part of an abrasive, closing the mold to confine the material in the cavity under pressure between the mold and the carrier, and then filling the remainder of the cavity between the particles with molten metal. When the metal is cooled until it solidifies, the particles of abrasive are bonded to each other and to the carrier, whereupon the carrier with the bonded material may be removed from the mold.

The apparatus employed for carrying out the method includes a mold and a container adapted to hold molten metal and communicating with the mold. The mold and container are supported in such a manner that the container extends upward from the mold for gravity flow of metal from the container into the mold. Additionally, the metal may be forced into the mold under the pressure of fluid whose source may be connected to the container.

Other features, additional objects and many of the advantages of this invention will become readily apparent from the following description of preferred embodiments when considered in conjunction with the attached drawing.

DESCRIPTION OF THE PREFERRED EMBODIMENTS

Figure 2:
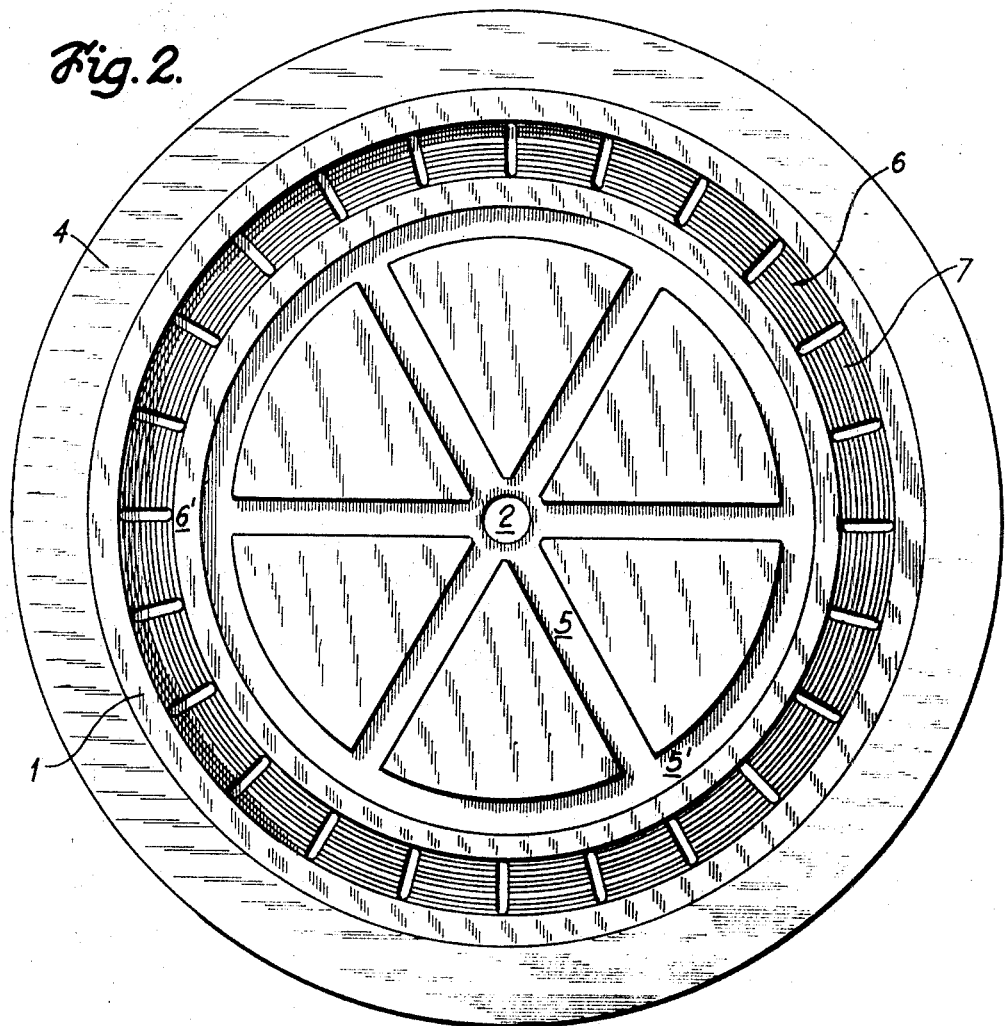
FIG. 2 shows the device of FIG. 1 in plan view.
Figure 1:
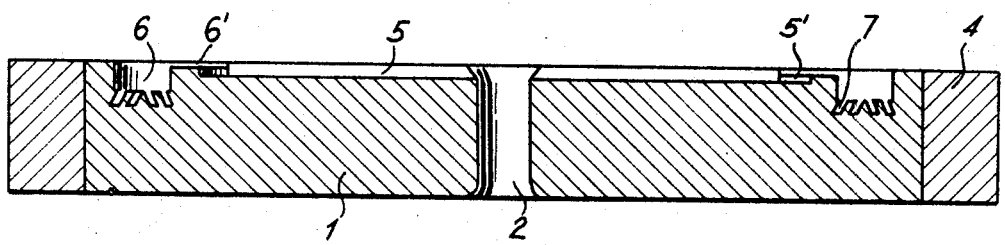
FIG. 1 shows a mold element and a core arranged in the mold element for preparing a bonded grinding wheel of the invention, the view being in elevational section.

Referring now to the drawing in detail, and initially to FIGS. 1 and 2, there is shown a flat circular disc 1 machined from an aluminum alloy. An axial bore 2 in the disc 1 has conically beveled orifices. Six shallow, radial grooves 5 in one of the flat surfaces of the disc 1 connect an orifice of the bore 2 with a shallow, annular groove 5' in the flat surface. A deeper annular groove 6 is separated from the groove 5' by a low wall portion 6' of the disc 1. The bottom of the groove 6 has narrow circumferential slots 7 which are obliquely inclined relative to the axis of the disc, one group of slots sloping toward the axis in an upward direction, as viewed in FIG. 1, the other group sloping toward the axis in a downward direction.

The disc 1 is received in a steel ring 4 of substantially equal axial height, the radial dimensions of the disc 1 and ring 4 providing a tight sliding fit. The ring 4 forms the short axial wall of a mold assembly, better seen in FIG. 3 whose radial bottom wall 8 is a steel plate having a circumferential flange, and whose top wall is formed by a similar plate 8' provided with an integral, centrally projecting tube 11. The bore 12 of the tube 11 has a gate portion 13 of greatly reduced cross section near the mold cavity. The plates 8, 8' are tightly assembled with the ring 4 by threaded bolts 10 passing through aligned bores 9 in the plate flanges and provided with nuts 10'.

Figure 3:
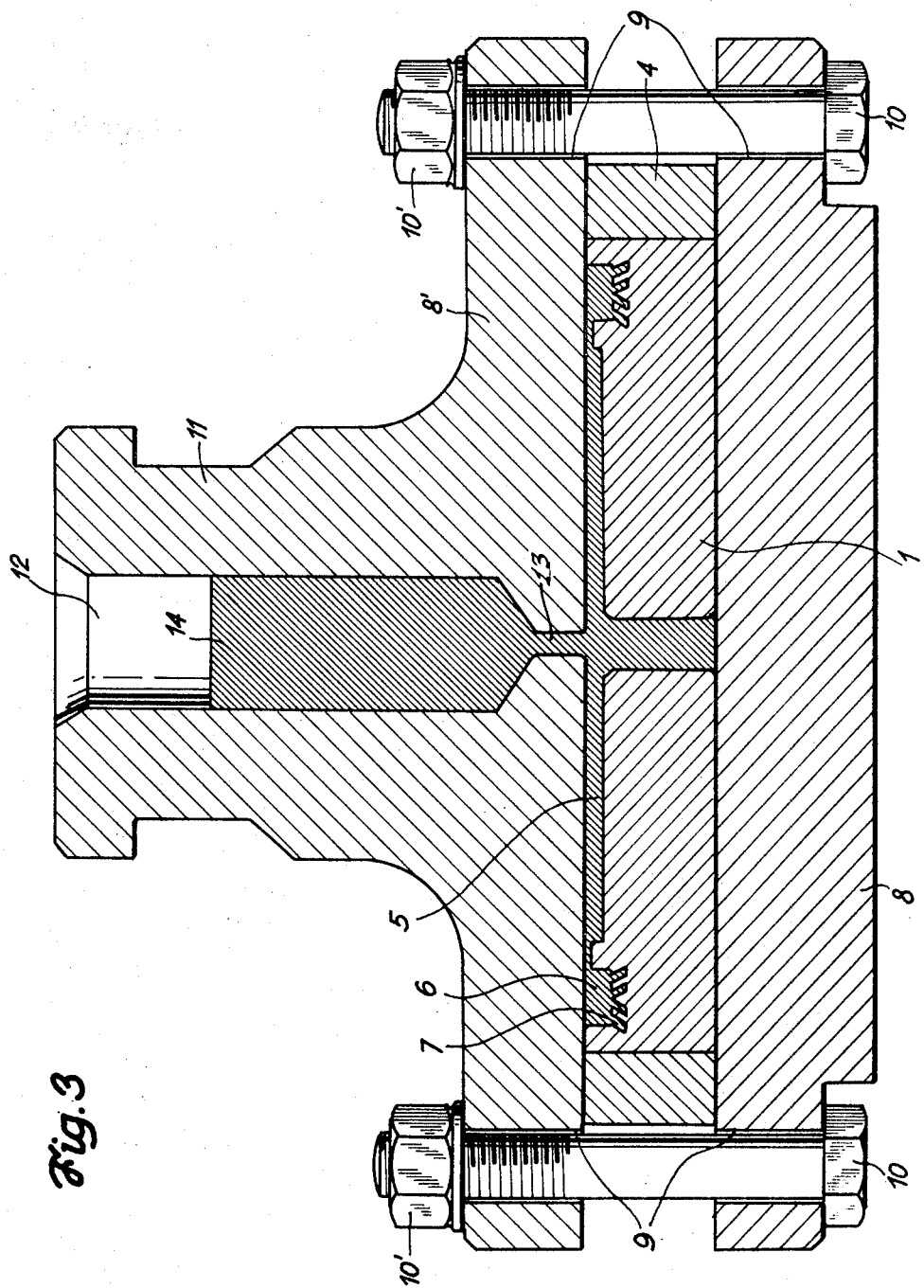
FIG. 3 illustrates a mold assembly including the device of FIG. 1, in a sectional elevational view.
Figure 4:
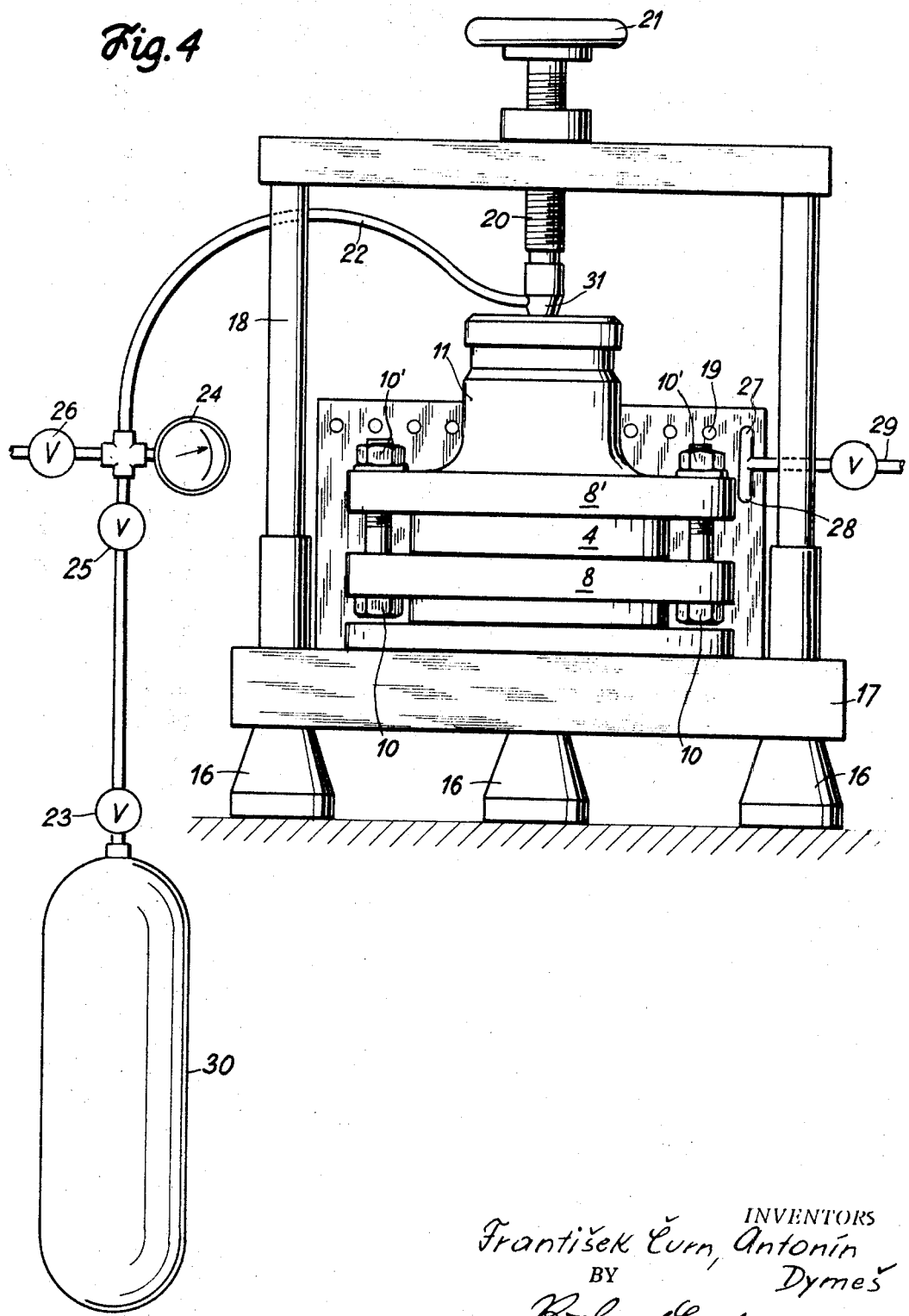
FIG. 4 illustrates casting equipment of the invention including the mold assembly of FIG. 3, in elevation.

The casting apparatus employed with the mold assembly of FIG. 3 is illustrated in FIG. 4. It includes a table 17 mounted on legs 16 and provided with a yoke 18 of inverted U-shape. The mold assembly is set on the table 17 under the yoke 18. A spindle 20 equipped with a hand wheel 21 threadedly engages the transverse portion of the yoke 18 and holds a nozzle 31 in sealing engagement with the open top of the bore 12 in the tube 11. The nozzle is connected to a compressed air tank 30 by a pipe 22 equipped with a pressure gage 24, and with manually operated valves 23, 25, 26. The valve 23 provides a shutoff at the tank 30. The valve 25 permits precise pressure control, and the valve 26 vents the pipe 22 to the atmosphere and permits the pressure in the mold assembly to be reduced quickly without disconnecting the tank 30 and without shutting it off.

A tubular skirt 19 spacedly envelops the mold assembly and is connected to a source of cooling water through a valved line 29. Two rows of nozzle openings 27, 28 in the skirt 19 are directed toward the mold assembly.

Figure 5:
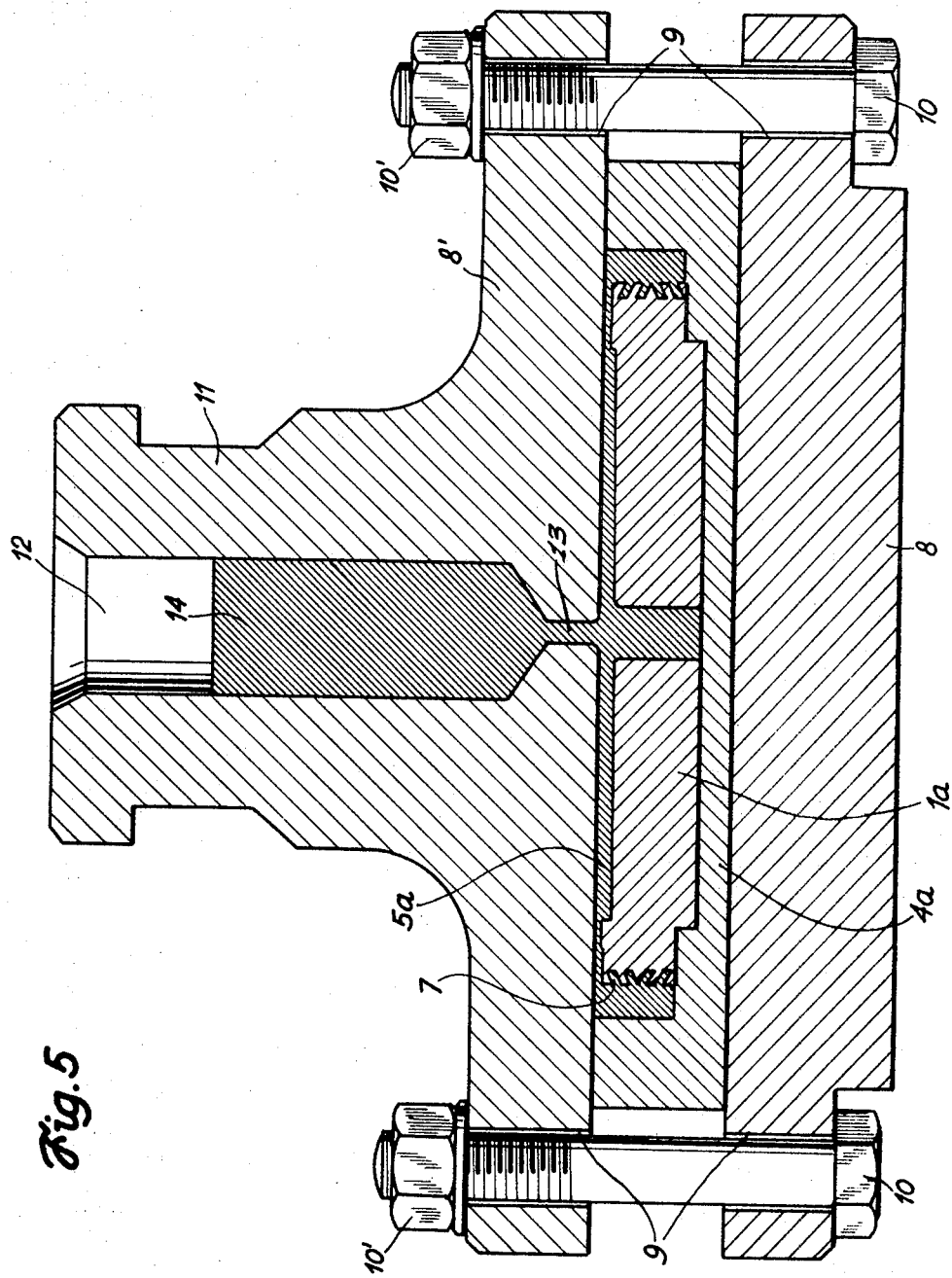
FIG. 5 shows a mold assembly similar to that of FIG. 3 in a corresponding view.

A modified mold assembly which may be substituted for the assembly shown in FIG. 3 in the casting apparatus illustrated in FIG. 4 is seen in FIG. 5. The mold assembly has plates 8, 8' held together by bolts 10 as described with reference to FIG. 3. The plates are separated by a cylindrical mold portion 4a having the shape of a shallow cup.

A precisely coaxial depression in the bottom of the cup matingly receives a locating projection on an aluminum alloy disc 1a. A cylindrical face of the disc 1a has slots 7 analogous to those on the bottom of the afore-described groove 6. The slotted face of the disc and the axial cup face of the mold portion 4a define an annular mold cavity connected to the central bore of the disc 1a and to the gate 13 in the plate 8' by runners 5a in the disc 1a.

The operation of the apparatus described in FIGS. 1 to 4 is illustrated by the following example:

The ring 4 and the aluminum alloy disc 1 were placed on a supporting surface, not shown in FIG. 1, with the groove 6 facing upward. The groove was filled with a mixture prepared from comminuted chips obtained in the machining of the disc 1, antimony powder, and diamond particles. The mixture contained 32% diamond particles of approximately 150 mesh, 24% aluminum chips 0.20–0.25 mm. long, and 44% antimony grains of 0.15–0.22 mm. It was firmly tamped into the groove 6 whereupon the bottom plate 8 was placed over the disc 1 and ring 4 to hold the compressed particulate mixture in position while the plate, ring, and disc were turned over into the position shown in FIG. 3, and assembled with the top plate 8' by means of the bolts 10 and nuts 10'.

A molten zinc alloy 14 containing 4% copper, 2% aluminum, and 2% silver as primary alloying ingredients was poured into the bore 12 of the tube 11 on the top plate 8'. The melting point of the alloy is 380° C. The mold asembly was next placed in a furnace heated to 400° C. for approximately 50 minutes. Gravity drove the liquid zinc alloy through the gate 13, the bore 2, the grooves 5, 5' which form runners, and into the groove 6.

The mold assembly was then removed from the furnace and placed on the table 17 under the yoke 18, as shown in FIG. 4. While the temperature of the mold assembly was still above the melting point of the zinc alloy, compressed air was admitted to the nozzle 31 from the tank 30 to raise the gage pressure within 30 seconds from 0 to 20 atmospheres. After this initial pressure pulse, the bleeder valve 25 was opened until the pressure dropped by 5 atmospheres. When the valve 25 thereafter was closed, the pressure quickly returned to 20 atmospheres and was held at this value for 15 seconds, whereupon it was raised to 35 atmospheres within 30 seconds, and quickly reduced to 25 atmospheres, boosted to 35 atmospheres, held at that value for 15 seconds, raised to 50 atmospheres within 45 seconds, reduced to 45 atmospheres, and ultimately raised to 50 atmospheres. This pressure was maintained for approximately three minutes until small amounts of liquid metal were discharged along the seams of the mold assembly between the ring 4 and the plates 8, 8'. At this moment, the mold was quickly cooled by water jets from the nozzle openings 27, 28, thereby solidifying the discharged metal, and sealing the seams, and the air pressure was released.

When the mold assembly was cool enough to be handled, it was disassembled and an abrasive wheel blank was removed. The blank consisted of the disc 1 serving as a carrier for an annular body of abrasive material in the groove 6 which was bonded by a hard alloy formed by the original zinc alloy and antimony dissolved in the zinc at the casting temperature.

The blank is readily converted into a cup wheel on a lathe by removing the portion of the disc 1 which extends radially beyond the groove 6, cutting an axial recess into the portion of the disc radially bounded by the groove 6, and drilling an arbor hole in the center of the disc. The outline of the cup wheel is shown in broken lines in FIG. 1.

A blank for a straight grinding wheel having a cylindrical facing of metal-bonded diamond particles was prepared in an analogous manner in the mold assembly shown in FIG. 5. The blank was finished by removing the locating projection and forming an arbor hole, as indicated by broken lines in FIG. 5. Zinc alloy may be removed from the cutting surface of the wheel by means of pumice in a conventional manner.

The zinc alloy bond produced in the manner described is hard enough to permit the economical use of diamond chips even when the wheel is to be used at reasonably high grinding pressures. Yet, it is so much softer than the diamonds that it is readily removed during the grinding operation when exposed between diamond particles in the grinding surface, so that fresh diamond particles are continuously exposed as needed.

The distribution of the diamond particles in the bond is maintained during introduction of the molten zinc alloy because the powder mixture is confined in the annular mold space under adequate pressure, and the stream of liquid metal entering the confined space must thread its way between the packed solid particles, and displacement of the particles by the moving liquid material is prevented or held to a minimum. The powder particles are not dissolved until the velocity of the alloy stream becomes too small and its viscosity too high to displace the diamond grains.

The proportions of abrasive grains and metal particles in the mixture initially packed into the mold may be varied to suit specific conditions. Useful grinding wheels have been produced by packing diamond powder without admixed metal particles into the mold and embedding them in zinc alloy under fluid pressure. A harder zinc alloy containing 1–10% antimony is preferred in this instance. It is readily possible in this manner to produce a grinding wheel in which most diamond particles are in direct contact with one or more other diamond particles.

When the diamond particles are packed into the mold cavity in mixture with particles of one or more metals which reinforce the zinc alloy, the abrasive grains are spaced uniformly, and the spacing can be controlled by varying the composition of the initial particulate mixture.

Abrasive particles ranging in size from 280 mesh to 80 mesh have been held in position successfully during the casting operation by metal particles having principal dimensions of 0.04–0.25 mm., the larger metal particles being usually combined with the larger abrasive grains.

The bonded abrasive layer is firmly secured to the aluminum alloy carrier by mechanical interlocking in and between the slots 7. While the exact angle of inclination of the slots relative to the grinding surface is not critical, very good results have been obtained with slots inclined at about 20° in opposite directions to a line perpendicular to the grinding face of the wheel.

Alloys of aluminum with minor amounts of magnesium and copper are convenient materials of construction for the carrier discs 1, 1a. They are readily machined and of adequate strength. Their melting point of about 600° C. is safely above that of the zinc alloys employed. However, the carrier may be made of any material which has a higher melting point than the bonding metal and whose solubility in the molten bonding metal is limited.

Specific dimensions of structural elements in the mold assembly will be selected readily by those skilled in the art. When six inch wheels were prepared in the mold assemblies illustrated in FIGS. 3 and 5, the runners 5, 5a had a depth of about 0.5 mm., and the diameter of the gate 13 was about one-fourth of the diameter of the bore 12 and about one-half of the diameter of the bore 2. Other dimensional relationships will be evident from the drawing.

While zinc casting alloys are preferred as main or sole constituents of the bond, other alloys whose melting point is lower than that of the carrier 1, 1a and of the mold assembly may be employed if their mechanical properties are adequate. Zinc alloys combine the well known advantages of ready availability, low material cost, and low tool cost with mechanical properties well suited for bonded diamond wheels.

The aluminum alloy and antimony particles admixed to the abrasive grains do not melt at the temperature of the molten zinc alloys and dissolve only slowly, thus hold the abrasive particles in their original position until the liquid metal stops moving and solidifies. The mechanical strength of the bond is greatly increased by the aluminum and antimony in the solidified material, and the increase in hardness is substantial.

An initial gravity casting period is beneficial in maintaining the original distribution of abrasive and metal particles in the ultimately produced wheel. Wetting of the solid metal by the molten zinc alloy is improved, and stronger adhesion between the bond and the carrier is achieved by the pulsed application of fluid pressure to the liquid metal. The values of pressure and time indicated above in the example have been found advantageous under the specific conditions described. Different sequential steps of gradually increasing fluid pressure separated by short periods of decreasing pressure will readily be determined by trial and error under different conditions. The useful life of the grinding wheel is distinctly affected by the method used in applying pressure pulses.

Grinding wheels having abrasive particles other than diamonds can be prepared in the same manner, and bonded silicon carbide wheels have been prepared successfully.

It should be understood, therefore, that the foregoing disclosure relates only to preferred embodiments and that it is intended to cover all changes and modifications of the examples of the invention herein chosen for the purpose of the disclosure which do not constitute departures from the spirit and scope of the appended claims.

We claim:

1. In a method of preparing an abrasive tool formed of an aluminum alloy body and abrasive material bound thereto by a bonding metal having a melting point lower than said metal alloy and abrasive material, the steps of:
   (a) inserting an aluminum alloy metal body in a mold in such a manner that the body bounds a cavity in said mold;
   (b) packing said mold cavity with a particulate mixture of inorganic abrasive material comprising diamond particles, aluminum chips and antimony grains;
   (c) closing said mold to confine said abrasive material in said cavity under pressure between said mold and said metal body, the closed mold having a normally closed seam;
   (d) introducing a molten zinc alloy bonding metal above 380° C. into said cavity between the particles of said material;
   (e) applying compressed air to said molten bonding metal in said mold in pulses of increasing pressure until a portion of said molten zinc alloy bonding metal is discharged from said seam;
   (f) cooling said discharged molten bonding metal until the remaining molten bonding metal with the cavity solidifies and bonds said particles of abrasive to each other and to said body; and
   (g) removing the body with the bonded abrasive material from said mold.

2. In a method as set forth in claim 1, said abrasive material including particles of the metallic material having a melting point higher than the temperature of said molten zinc alloy metal.

3. In a method as set forth in claim 2, said abrasive metallic material and said body being wetted by said molten zinc alloy bonding metal, said abrasive metallic material being partly soluble in said molten zinc alloy bonding metal, and the introducing of said molten zinc alloy bonding metal into said cavity being completed before said abrasive metallic material dissolves in the molten bonding metal.

4. In a method as set forth in claim 1, said molten zinc alloy bonding metal having a temperature lower than the softening point of said antimony and of the alloy material constituting said body.

5. In a method as set forth in claim 1, machining said carrier into the shape of said tool after removal from said mold.

6. The method according to claim 1 wherein said abrasive particles comprises a mixture of antimony and aluminum-copper-magnesium alloy.

References Cited

UNITED STATES PATENTS

| | | | |
|---|---|---|---|
| 1,692,725 | 11/1928 | Edmondson et al. | 51—309 |
| 2,187,384 | 1/1940 | Maier | 51—309 |
| 2,240,829 | 5/1941 | Bevillard | 51—309 |
| 2,270,209 | 1/1942 | Pyl | 51—309 |
| 2,370,970 | 3/1945 | Keeleric | 51—309 |
| 2,467,596 | 4/1949 | Pratt | 51—309 |
| 2,800,753 | 7/1957 | Hollstrom | 51—309 |

DONALD J. ARNOLD, Primary Examiner

U.S. Cl. X.R.

51—293